(12) United States Patent  
Sokol et al.

(10) Patent No.: US 9,741,202 B2  
(45) Date of Patent: Aug. 22, 2017

(54) METHOD OF ONLINE VALUATING A CLIENT AND A SYSTEM THEREOF

(71) Applicant: Playtech Software Limited, Isle of Man, British Isles (IM)

(72) Inventors: Damian Sokol, Gibraltar (GI); Pavlin Djokov, Plovdiv (BG)

(73) Assignee: PLAYTECH SOFTWARE LIMITED, Douglas (IM)

( * ) Notice: Subject to any disclaimer, the term of this patent is extended or adjusted under 35 U.S.C. 154(b) by 213 days.

(21) Appl. No.: 14/612,390

(22) Filed: Feb. 3, 2015

(65) Prior Publication Data

US 2015/0221166 A1   Aug. 6, 2015

Related U.S. Application Data

(60) Provisional application No. 61/934,901, filed on Feb. 3, 2014.

(51) Int. Cl.
| | |
|---|---|
| *A63F 9/24* | (2006.01) |
| *G07F 17/32* | (2006.01) |
| *G06Q 20/22* | (2012.01) |

(52) U.S. Cl.
CPC ....... *G07F 17/3239* (2013.01); *G06Q 20/227* (2013.01); *G07F 17/3234* (2013.01); *G07F 17/3237* (2013.01); *G07F 17/3293* (2013.01)

(58) Field of Classification Search
CPC ............. G06Q 20/227; G07F 17/3234; G07F 17/3237; G07F 17/3239; G07F 17/3293
See application file for complete search history.

(56) References Cited

U.S. PATENT DOCUMENTS

| | | | | |
|---|---|---|---|---|
| 2006/0175758 A1* | 8/2006 | Riolo | ......................... | A63F 1/00 273/292 |
| 2012/0256377 A1* | 10/2012 | Schneider | ............ | A63F 3/00157 273/292 |
| 2014/0004926 A1* | 1/2014 | Melton | ................ | G07F 17/3293 463/25 |

* cited by examiner

*Primary Examiner* — Justin Myhr
(74) *Attorney, Agent, or Firm* — Cantor Colburn LLP (57) ABSTRACT

There is provided a system and method of online valuating a client in a computerized service system (e.g. game system). The method comprises: identifying all clients directly involved in a monetary event; for each identified directly involved client Ci, searching a stored plurality of records for all records informative of monetary chunks tagged with the client Ci as an owner, and associating with the client Ci a virtual account Ai, the virtual account Ai being informative of all monetary chunks in an ownership of the client Ci, thereby giving rise to a plurality of virtual accounts associated with the identified directly involved clients, wherein each monetary chunk is further tagged with a depositor client who introduced the respective monetary chunk into the service system and with respective timestamp; identifying every client tagged as depositor client to at least one monetary chunk corresponding to at least one virtual account of the plurality of virtual accounts, thereby giving rise to a plurality of clients indirectly involved in the event; and valuating one or more clients directly or indirectly involved in the event, wherein a value of each given client is calculated with consideration of all monetary chunks corresponding to the plurality of virtual accounts and tagged to the given client as a depositor client.

13 Claims, 8 Drawing Sheets

Virtual Account (301)

| |
|---|
| <Amount in NW currency> <Depositor> <Time stamp> (301-1) |
| ......... |
| ......... |
| <Amount in NW currency> <Depositor> <Time stamp> (301-n) |

Figure 3a

Exemplified queue of money chunks (302)

| |
|---|
| (302-1) 10$ Player A, 06/08/2013 01:10:21 |
| (302-2) 10$ Player B, 06/08/2013 01:08:11 |
| (302-3) 20$ Player C, 06/08/2013 01:08:10 |
| (302-4) 10$ Player D, 06/08/2013 01:08:10 |
| (302-5) 5$ Player B, 01/08/2013 11:12:44 |
| (302-6) 20$ Player D, 01/08/2013 01:15:33 |
| (302-7) 10$ Player C, 30/07/2013 22:11:21 |
| (302-8) 20$ Player A, 30/07/2013 22:10:02 |

← Oldest money

TIME

METHOD OF ONLINE VALUATING A CLIENT AND A SYSTEM THEREOF

CROSS-REFERENCES TO RELATED APPLICATIONS

The present application claims benefit from U.S. Provisional Application No. 61/934,901 filed on Feb. 3, 2014, the entire content of this application being hereby incorporated by reference in its entirety.

TECHNICAL FIELD

The presently disclosed subject matter relates to online valuation of clients, and, more particularly, to valuating online players.

BACKGROUND OF THE INVENTION

Numerous organizations and companies need to valuate their clients in order to provide services and/or incentives tailored to different clients' ranks. For purpose of illustration only, the following description is provided for players of online poker games. Those skilled in the art will readily appreciate that certain teachings of the present disclosure are applicable in a similar manner to players of other online games as well as to clients of financial companies, content distribution companies, etc.

The problems of valuating a player have been recognized in the prior art and various techniques of calculating a player's value have been developed to provide solutions. Known in the art solutions of valuating a player include solutions based on attributing all the value to the person who generates the actual rake and solutions based on attributing all the value on deposits and net losses.

In online poker, the money made by the operators is equal to the amount that is taken off the table at the end of a hand or—in poker tournaments—the entry fee. Some of the known in the art methods look at rake only, and they are agnostic of where the money used to pay the rake actually came from. Some other methods known in the art look, alternatively or additionally, at the net win/net loss of the players participating in the hand.

For any single poker hand, the following formula is true when summed up over all players who took part in the hand: Sum (Bets−Wins)=Sum (Rake). This means that one can actually vary the formula for calculating player value for individual players in such a way that the total sum is still equal to the total rake.

Player's value (PV) can be calculated by PVc formula (also referred to hereinafter also as "conventional rake (CR) based on activity" or "conventional rake formula"):

$$PVc = c*Rake + (1-c)*(Bets-Wins); \text{ with } 0 \leq c \leq 1 \quad (1).$$

For c=0, Player Value=(Bets−Wins)=Net Loss. For c=1, Player Value=Rake. By choosing a value for c between these two extremes, one can create a player valuation formula that lies in between these two extremes.

By comparing Rake with (Bets−Wins) across entire operators or player populations, one can also assess the type of players and the type of operators and their contribution to the network.

Other known in the art solutions can combine the Net Loss analyses above with assigning a "score" to each player. At the end of the hand, the score of all players is compared and the rake taken in this hand is then assigned to these players, based on the play of the hand and also based on their score. Thus, a higher proportion of the rake is assigned to players who otherwise show characteristics that are deemed beneficial from a game point of view. For example, a player that has accumulated large lifetime losses will be attributed a higher proportion of the rake than a player who is a net winner.

Another known in the art solution is to encourage a behaviour change in operators on a network by having monthly bonuses and/or penalties based on certain underlying operator wide KPIs (key performance indicators).

General Description

In accordance with certain aspects of the presently disclosed subject matter, there is provided a method of valuating a client in a computerized on-line service system comprising a processor operatively coupled to a memory storing a plurality of records informative of monetary chunks, each record informative of the monetary amount of the respective monetary chunk and tagged with a client who owns the respective monetary chunk. The method comprises providing by the processor in cooperation with the memory: identifying all clients directly involved in a monetary event; for each identified directly involved client $C_i$, searching the stored plurality of records for all records informative of monetary chunks tagged with the client $C_i$ as an owner and associating with the client $C_i$ a virtual account $A_i$, the virtual account $A_i$ being informative of all monetary chunks in an ownership of the client $C_i$, thereby giving rise to a plurality of virtual accounts associated with the identified directly involved clients, wherein each monetary chunk in the virtual account is further tagged with a depositor client who introduced the respective monetary chunk into the service system and with respective timestamp; identifying every client tagged as a depositor client to at least one monetary chunk corresponding to at least one virtual account of the plurality of virtual accounts, thereby giving rise to a plurality of clients indirectly involved in the event; and valuating one or more clients directly or indirectly involved in the event, wherein a value of each given client is calculated with consideration of all monetary chunks corresponding to the plurality of virtual accounts and tagged to the given client as a depositor client.

The on-line service system can be an e-commerce system, a game system, a social network platform, advertising system, etc. By way of non-limiting examples, the monetary event can be an e-auction, a game event, a peer-to-peer event associated with monetary transaction, etc.

In accordance with other aspects of the presently disclosed subject matter, there is provided a method of online valuating a poker player in a computerized game system comprising a processor operatively coupled to a memory storing a plurality of records informative of monetary chunks, each record informative of the monetary amount of the respective chunk and tagged with a player who owns the respective monetary chunk. The method comprises providing by the processor in cooperation with the memory: identifying all players directly involved in a poker hand; for each identified player $P_i$ directly involved in the poker hand, searching the stored plurality of records for all records informative of monetary chunks tagged with the player $P_i$ as an owner and associating with the player $P_i$ a virtual account $A_i$, the virtual account $A_i$ being informative of all monetary chunks in an ownership of the player $P_i$, thereby giving rise to a plurality of virtual accounts associated with the identified players directly involved in the poker hand, wherein each monetary chunk in the virtual account is further tagged with a depositor player who introduced the respective monetary chunk into the game system and with respective timestamp; identifying every player tagged as a depositor player to at least one monetary chunk corresponding to at least one virtual account of the plurality of virtual accounts, thereby giving rise to a plurality of players indirectly involved in the poker hand; calculating, for each given player of the plurality of players indirectly involved in the poker hand, a value corresponding to a source-based rake (SBR) to be attributed to such player in consideration of a monetary amount invested into a pot of the poker hand and tagged with the given player as a depositor; and calculating, for each given player directly or indirectly involved in the poker hand, a value on rake (APV_RAKE), wherein

APV_RAKE=C*PLAYER_RAKE_ACTIVITY+(1−C)*SBR, wherein PLAYER_RAKE_ACTIVITY is a value corresponding to a rake to be attributed to the given player in consideration of a monetary amount invested into a pot of the poker hand and tagged with the player as an owner, and where C is configurable parameter, 0≤C≤1.

The method can further comprise providing by the processor in cooperation with the memory: identifying all players directly involved in a poker tournament; associating with each identified player directly involved in the poker tournament a corresponding virtual account, thereby giving rise to a plurality of virtual accounts associated with the identified players directly involved in the poker tournament; identifying every player tagged as a depositor player to at least one monetary chunk corresponding to at least one virtual account of the plurality of virtual accounts, thereby giving rise to a plurality of players indirectly involved in the poker tournament; calculating, for each given player of the plurality of players indirectly involved in the poker tournament, a value corresponding to a source-based fee (SBF) to be attributed to such player in consideration of a monetary amount invested into a fee of the poker tournament and tagged with the given player as a depositor; and calculating, for each given player directly or indirectly involved in the poker tournament, a value on fee (APV_FEE), wherein

APV_FEE=K*PLAYER_FEE_ACTIVITY+(1×K)*SBR, wherein PLAYER_FEE_ACTIVITY is a value corresponding to a fee to be attributed to the given player in consideration of a monetary amount invested into a fee of the poker tournament and tagged with the player as an owner, and where K is configurable parameter, 0≤K≤1.

The method can further comprise providing by the processor in cooperation with the memory calculating a value of a player during a valuation period by summing all APV_RAKE and APV_FEE values calculated for the player for all poker hands and poker tournaments where the player was, directly or indirectly, involved during the valuation period.

In accordance with other aspects of the presently disclosed subject matter, there is provided a management system capable of online valuating a client in a computerized service system, the management system comprising a processor operatively coupled to a memory configured to store a plurality of records informative of monetary chunks, each record informative of the monetary amount of the respective monetary chunk, the processor configured: to tag each record of the plurality of records with a client who owns the respective monetary chunk, with a depositor client who introduced the respective monetary chunk into the service system and with respective timestamp; for each client directly involved in a monetary event, to generate a respective virtual account, thereby giving rise to a plurality of virtual accounts associated with the clients directly involved in the monetary event, wherein generating a virtual account to a given client comprises: i. searching the plurality of records for all records informative of monetary chunks tagged with the given client as an owner; ii. associating with the given client a virtual account being informative of all monetary chunks in an ownership of the given client, the virtual account being further informative of respective depositor clients and timestamp; to parse the plurality of virtual accounts to identify every client tagged as a depositor client to at least one monetary chunk corresponding to at least one virtual account of the plurality of virtual accounts, thereby giving rise to a plurality of clients indirectly involved in the event; and to valuate one or more clients directly or indirectly involved in the event, wherein a value of each given client is calculated with consideration of all monetary chunks corresponding to the plurality of virtual accounts and tagged to the given client as a depositor client.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "calculating", "generating", "identifying", "searching" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities, including the presently disclosed game system and respective parts thereof.

The operations in accordance with the teachings herein may be performed by a computer specially constructed for the desired purposes or by a general-purpose computer specially configured for the desired purpose by a computer program stored in a computer readable storage medium.

Figure 1:
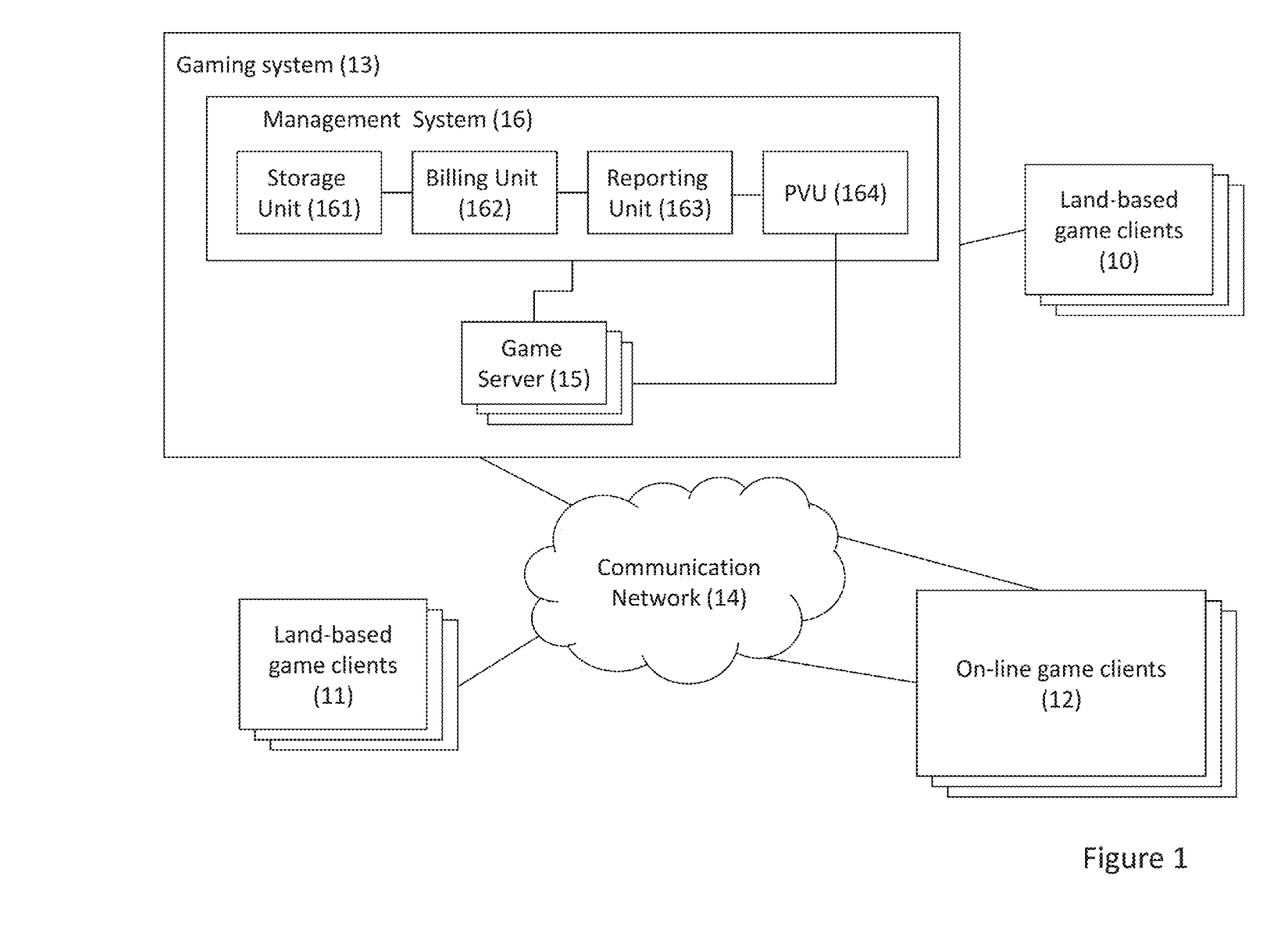
FIG. 1 illustrates a generalized functional block diagram of an exemplified game ecosystem comprising a computerized game system applicable to certain embodiments of the presently disclosed subject matter.

Bearing this in mind, attention is drawn to FIG. 1 illustrating an exemplified game ecosystem comprising a computerized gaming system in accordance with certain embodiments of the presently disclosed subject matter. The gaming system 13 is operatively coupled to a plurality of land-based game terminals 10, 11 and online game clients 12. The land-based game terminals can be connected to the gaming system directly or via a communication network 14 (e.g. Wireline or Wireless Public Telephone Networks, Internet, Intranet, cable network, etc.). The online game clients can be associated with any device having input and display capabilities (e.g. personal computer, workstation, PDA, mobile phone, WebTV device, wagering machine, etc.) and capable to communicate with the game system 13 directly or via communication network 14. Optionally, such a device can be further capable of video capturing and/or audio input/output capabilities.

By way of non-limiting example, the online game clients can be downloaded to the respective devices and/or accessed with the help of such devices from the web via a web browser. In certain embodiments of the invention the device can be also capable to execute at least part of a gaming application. In certain embodiments, the game clients can be associated with land-based gaming terminals 10, 11 and/or with the game system itself (e.g. a game system in a land-based casino can support one or more directly associated clients).

In certain embodiments of the system there can be provided an exchange of live video/audio inputs between the clients (and/or associated devices) and the gaming system. The display capabilities of the devices can include capabilities of showing a video image of the other players and/or dealer.

For purpose of illustration only, the following description is made with respect to online game clients. Those skilled in the art will readily appreciate that the teachings of the presently disclosed subject matter are not bound by these online game clients and are applicable in a similar manner to land-based clients operatively coupled to the game system and/or any combination of online clients and land-based clients and/or to a game system implemented in a land-based casino.

The game system 13 comprises one or more gaming servers 15 configured to receive input data from one or more game clients, to execute logic of one or more certain games accordingly, and to report outcome(s) to the game clients in accordance with gaming principles and rules. By way of non-limiting example, server 15 can be configured as a server-side of a gaming application, wherein each gaming client can be configured to execute the corresponding client-side. The sharing of functions between the game server and the game clients may vary depending on the game and implementation thereof, for example the game client can provide only functions of input/output and/or additionally execute certain programs related to output graphics and/or additionally execute part or all programs related to a game logic and exchange the data with the game server, etc.

It is appreciated that term "server" used throughout the specification refers to a server comprising a data processor, a memory, a communication interface and one or more computer programs stored in the memory.

The game system further comprises a management system 16 which can be implemented on one or more operatively connected servers located at the same or at different locations.

The management system 16 is operatively coupled to the game server(s) and can be configured to monitor the entire lifecycles of the players. The management system comprises operatively coupled therebetween storage unit 161, billing unit 162, reporting unit 163 and player valuating unit (PVU) 164. The storage unit is configured to accommodate one or more databases storing and maintaining all necessary information related to the games and players, including configuration of the game server(s) (e.g. available games, game limits, etc.), user-related data and profiles, subscription management data (e.g. data related to opening an account for a user, closing an account, allowing a user to add or withdraw funds from an account, changing the user's address or personal identification number, etc.), session histories, detailed game results, monetary transactions data, statistical data, etc. User-related data can include data related to the gaming of certain users, for example, number and sums of wagers during the former week, favourite fields of games, sum of money won, bonuses, etc. User-related data can include also user-valuation data provided by the PVU 164. As further detailed with reference to FIGS. 2-8, the PVU is operable to enable valuating the players in accordance with certain embodiments of the presently disclosed subject matter.

The gaming system can comprise other servers (not shown) operatively coupled to the management system 16, as, by way of non-limiting example, a security server, administration server, live game server and others. The servers are configured to exchange data with the management system 16 and/or gaming server 15.

Those skilled in the art will readily appreciate that the invention is not bound by the architecture detailed with reference to FIG. 1, equivalent and/or modified functionality can be consolidated or divided in another manner and can be implemented in any appropriate combination of software, firmware and hardware. Those skilled in the art will also readily appreciate that the data repositories can be consolidated or divided in other manner; some databases can be shared with other systems or be provided by other systems, including 3rd party equipment. The PVU and/or parts thereof can be implemented as a block (logical and/or physical) integrated with the game server and/or with other servers of the game system. Alternatively, the PVU can be implemented as an external unit to be used in conjunction with the game system.

Figure 2:
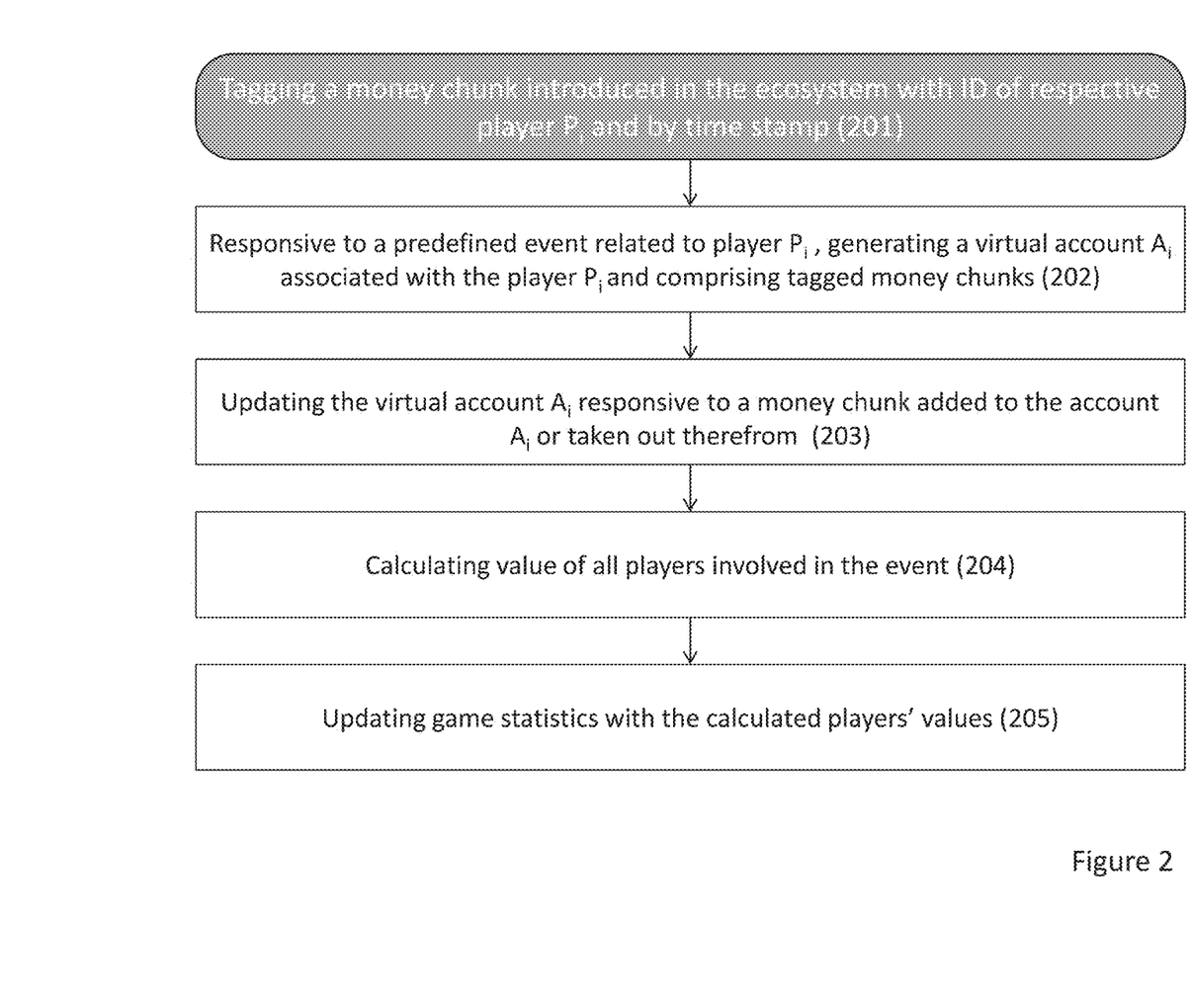
FIG. 2 illustrates a generalized flow chart of valuating a player in accordance with certain embodiments of the presently disclosed subject matter.

Referring to FIG. 2, there is illustrated a generalized flow chart of valuating a player in accordance with the presently disclosed subject matter.

Valuating a player using known in the art solutions can have several drawbacks. For example, Net Loss values can be easily manipulated, by creating two player accounts, A and B, depositing money into A and using the money to account B before cashing out the remaining funds. As a result, account A will show an extremely high "value", and account B will show a negative one. This tactic can be used by cannibalistic operators to earn extra money, while lowering the KPIs of others.

Further, Net Loss based formulas can create negative player values quite easily. In general, customers do have a net positive effect on a poker room, even if they are winning. A network always needs to avoid providing any incentive to its operators to dispose of certain players, as this has immensely negative public relations consequences which will be blamed on the network, and not the operator in question. In order to address the problem of excessive draining of funds by certain players, disposing of these players does not resolve the problem as their role will simply be assumed by others.

Furthermore, Net Loss based formulas can create extreme fluctuations in player value. On a formula with c=0, where player value=net loss, a player who deposits $1500 and loses $1000 it within 1 day is worth $1000 on day 1. If he wins all of it back the next day, his value will drop back to 0. Such extreme fluctuations create a wide range of issues for any business and any CRM or acquisition strategy.

Known rake redistribution approaches also can have several problems. For example, the selection of parameters and factors used is more or less arbitrary and is usually not based on logically deductible principles. Therefore, it is problematic to be sure that the formula itself is actually effective and whether the consequences it would produce are beneficial to the network or not. The rake is distributed only between the players that are active in the hand. The net effect of rake redistribution formulas on player value is usually too weak and insufficient to trigger a change in the marketing strategies of operators on the network. Rake redistribution formulas are usually very complex and hard to understand, thus marketing and promoting such formulas to operators on the network may be problematic.

In accordance with certain aspects of the presently disclosed subject matter, there is provided a method and system for valuating a player in accordance with tracking origination and circulation of money in a game ecosystem.

When registering to the game ecosystem, each player $P_i$ is provided by the management system with a player's $ID_i$. After a monetary chunk is introduced into the game ecosystem (e.g. a player $P_i$ has invested to the pot or tournament), the management system tags (201) the monetary chunk with $ID_i$ of respective player $P_i$ with a timestamp informative of the time of predefined event. By way of non-limiting example, timestamp can correspond to a tagging event. By way of alternative non-limiting example, in the case of poker, the timestamp can correspond to a moment when the money was brought to the table or otherwise became visible to the poker game. A monetary chunk can be introduced by depositing by a player or by assigning the chunk to a respective player by the management system. For each money chunk the management system manages a database record (e.g. in the storage unit 161) informative of the monetary amount of the respective chunk and tagged with account owner ID, ID of a player who introduced the chunk to the game ecosystem and respective timestamp.

Responsive to a predefined event (e.g. registration of a player $P_i$ to a tournament, end of a first hand where the player $P_i$ was played, etc.), the management system 16 queries the database for monetary chunk records tagged with the player $P_i$ as an owner; and generates (202) a virtual account $A_i$ associated with the player $P_1$. The virtual account $A_i$ is informative of all monetary chunks in an ownership of the player $P_i$, while the monetary chunks can be of arbitrary value and can be received from different depositors.

Figure 3A:
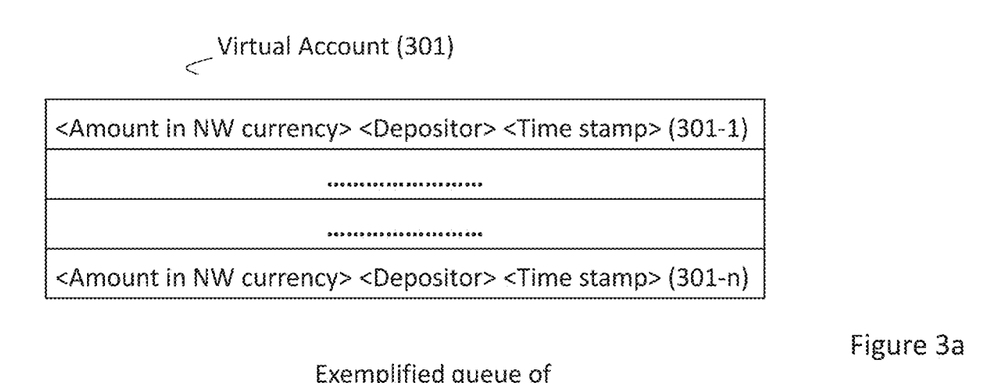
FIGS. 3a and 3b illustrate a generalized example of a virtual account and an exemplary queue therein in accordance with certain embodiments of the presently disclosed subject matter.

A non-limiting example of a virtual account 301 associated with the player $P_i$ is illustrated with reference to FIG. 3a. Virtual account 301 comprises one or more records informative of monetary chunks 301-1-301-n, each record informative of a monetary amount in a network currency, ID of a player who has introduced the money in respective money chunk into the game ecosystem (such players are referred to hereinafter also as "depositors"), and a respective timestamp. The records are organized in a queue in accordance with the timestamps. A non-limiting example of a queue 302 of the virtual account 301 is illustrated with reference to FIG. 3b. The records 302-1-302-8 are sorted in accordance with their timestamps. The queue is further configured so that the monetary chunks tagged with other than the player Pi depositors are always first to "come out" in an order corresponding to the timestamps of the chunks, while the money tagged with the player $P_i$ can be used only if the Virtual Account $A_i$ comprises no monetary chunks tagged with other players.

Optionally, the virtual account can comprise several queues. By way of non-limiting example, monetary chunks corresponding to cash money, and monetary chunks corresponding to token-related money, can be handled in separate queues.

Every time the player wins a token, it is added to a separate tokens queue. If the source of the token is a bonus (including given as a reward, bought from gift shop, etc.), the token amount, i.e. the money that the token corresponds, is tagged with the player and with a timestamp corresponding to the moment when the token gets used. In order for a bonus token to be used, the token queue of the player should not contain a token of this monetary value. A winning token (i.e. a token won from a tournament) keeps the tagging of the monetary chunk(s) used to build the token as a tournament prize.

When a player registers to a tournament using a token, the system finds the oldest token with the same Buyin+JP_fee+fee monetary value as of the tournament and adds it to the tournament prize pool, keeping the tags. If the tokens' queue is empty or there is no such token, the token is "issued" by the managing system and tagged to the player.

Expiration or cancellation of the token does not affect the virtual queue of tokens of the player. A token can be removed from the queue only when used for registration.

The following non-limiting example illustrates the managing of a token queue. Player A was given 2$ token as a bonus on Jan. 1, 2014. The token is not added to the token's queue yet. Now the player registers for 3 players real money tournament in cash with 1$ tagged with Player A, and the tokens queue is not affected. In this tournament, players B and C are registered with monetary chunks tagged, respectively, with players B and C. The tournament gives a first prize token with a value of 2.7$ (0.3$ are the total fees). Player A wins the tournament and value 2.7$ of this token is added to tokens queue in Player's A virtual account, while 0.9$ tagged with player A as depositor, 0.9$ tagged with player B as depositor and 0.9$ tagged with player C as depositor. If player A registers with cash to 2.7$ buy-in tournament, the token queue will not be affected.

Referring back to FIG. 2, for each player having a virtual account, the management system updates (203) the virtual account $A_i$ responsive to a money chunk added to the account $A_i$ (e.g. won from other players, deposited, etc.) or taken out therefrom (e.g. for wagering). Generating and managing virtual accounts is further detailed with reference to FIGS. 5-8. Management of virtual accounts can be provided by the PVU 164 in cooperation with other units of the management system.

As detailed in the embodiment above, the management system is configured to maintain both records informative of monetary chunks and virtual accounts. Alternatively, the management system can constantly update only the respective records, and generate virtual on-accounts (each time in accordance with the mostly updated records) as a part of value calculation process.

The management system identifies players involved, directly or indirectly, in certain event(s) and uses respective virtual accounts for calculating (204) the value of these players. The management system further updates (205) the game statistics accordingly. The value of a given player is calculated in accordance with his/her own activity and further in accordance with involvement of monetary chunks, tagged with the given player as a depositor, into the activity of other players. Such calculations can be provided periodically and/or responsive to predefined events.

By way of non-limiting example, valuation of players is further detailed with reference to poker players. Those skilled in the art will readily appreciate that players' valuation using source tagging of monetary chunks associated with the respective virtual accounts can be applicable for valuating the players of other on-line games and valuating clients of other service ecosystems.

A factor characterizing a poker ecosystem is deposit-to-rake conversion, which can be calculated as the percentage of deposits made which ultimately ends up turning into rake, as opposed to turning into cash-outs. The deposit-to-rake conversion is not a constant and can be affected by changes in the poker ecosystem. For example, the success of a strategy of maximizing deposits can be achieved at the expense of declining deposit-to-rake conversion, resulting in less revenue for the operators. Conversely, the success of a strategy of optimizing the deposit-to-rake conversion (e.g. by matching players according to their skill level) can have a severely detrimental effect as it can cause players to cash-out en masse, and can discourage new players from making new deposits in the poker room in question.

Accordingly, maximizing long term revenues for a poker ecosystem can be characterized by the following, potentially conflicting, factors: created deposits, generated rake and deposit-to-rake conversion.

Figure 4:
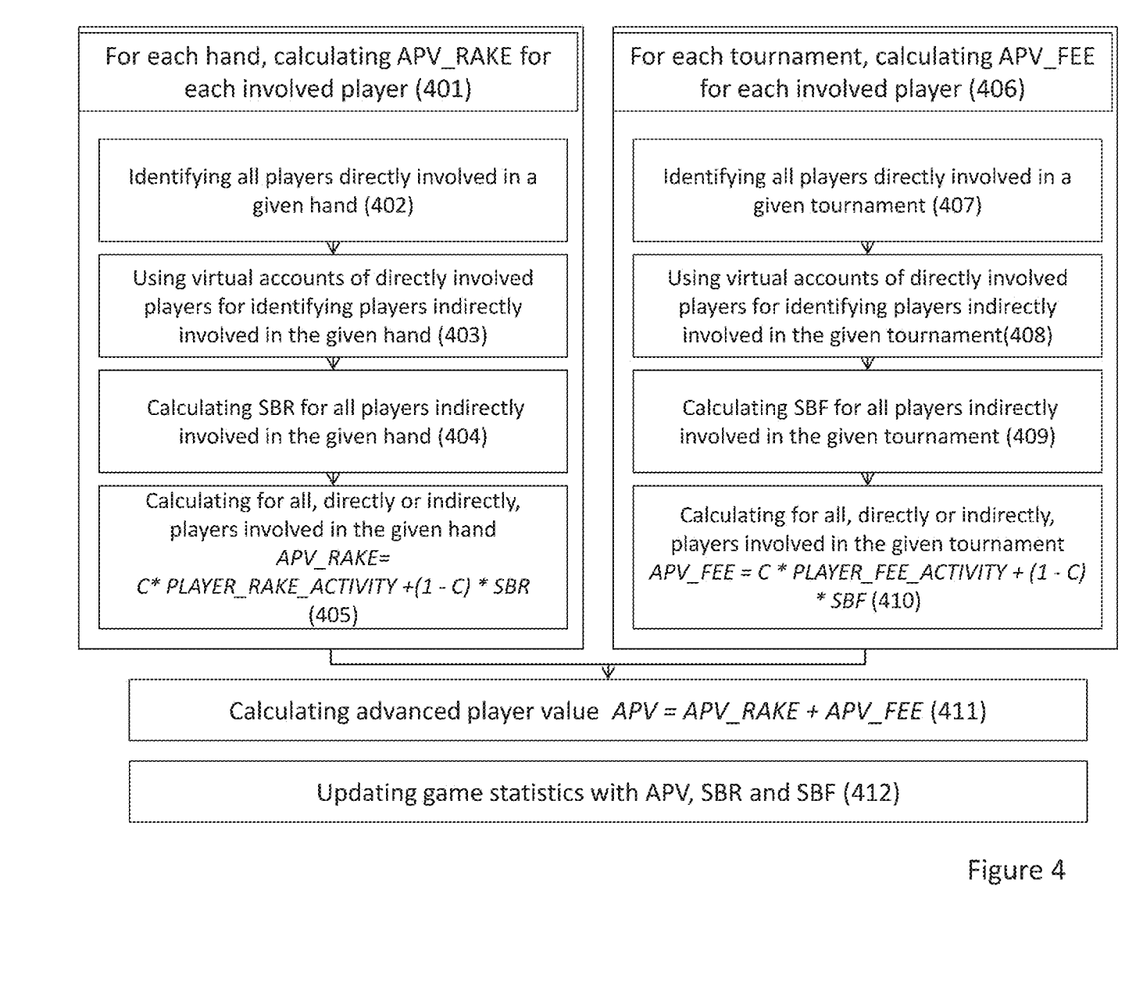
FIG. 4 illustrates a generalized flow chart of calculating a value for a poker player in accordance with certain embodiments of the presently disclosed subject matter.

Referring to FIG. 4, there is illustrated a generalized flow chart of valuating poker players. In accordance with certain embodiments of the presently disclosed subject matter, a value of a poker player (referred to hereinafter also as Advanced Player Value) is defined as a sum of Advanced Player Value on rake (APV_RAKE) and Advanced Player Value on fee (APV_FEE):

$$APV=APV\_RAKE+APV\_FEE \quad (2).$$

It is assumed that a jackpot fee does not generate value and winning a jackpot does not affect virtual accounts of the players.

The Advanced Player Value on rake (APV_RAKE) is calculated based on the conventional player rake based on activity (e.g. rake attributed to the player because of his/her contribution of money to the pot and calculated using the equation (2)), and on the rake attributed to the player because the player has been tagged as a source of the money that was invested into the pot by another player(s) (such a rake is referred to hereinafter as a source-based rake (SBR)):

$$APV\_RAKE = C*PLAYER\_RAKE\_ACTIVITY+(1-C)*SBR \quad (3)$$

For every hand, the managing system 16 is configured to calculate (401) the APV_RAKE for all players involved in the hand, directly and indirectly. Calculating AVT_RAKE comprises identifying (402) all directly involved players (i.e. players who played a given hand), using the virtual accounts of the directly involved players for identifying (403) indirectly involved players (i.e. players tagged as depositors of money chunks involved in the hand playing), calculating SBR (404) for all indirectly involved players and using the equation (3) for calculating (405) the APV_RAKE for all identified directly and indirectly involved players. It is noted that some of the indirectly involved players can also play the given hand, while some other indirectly involved players can be involved only via monetary transfers in accordance with the hand results.

The Advanced Player Value on fee (APV_FEE) is calculated based on the fee attributed to the player because of participation in the tournament and the fee attributed to the player because the player has been tagged as a source of the money that was used for tournament registration/rebuy or add-on (such a fee is referred to hereinafter as a source-based fee (SBF)):

$$APV\_FEE=C*PLAYER\_FEE\_ACTIVITY+(1\times C)*SBF \quad (4)$$

The managing system 16 is configured to calculate (406) the APV_FEE for all players participated in the tournament, directly and indirectly. Calculating AVT_FEE comprises identifying (407) all players directly participated in the tournament, using the virtual accounts of the directly participated players for identifying (408) indirectly participated players (i.e. players tagged as depositors of money chunks involved in fees paid by the directly participating players), calculating SBF (409) for all indirectly participated players and using (410) the equation (4) for calculating the APV_FEE for all identified directly and indirectly participated players.

Optionally, the indirect players can be limited by players registered into a poker ecosystem. Alternatively, in a case of game ecosystem supporting several games, SBF and SBR can be calculated across the games.

Optionally, the players can be grouped (e.g. by casino, priority level, etc.), while SBF and SBR values can be calculated for the group.

Optionally, alternatively or additionally to tagging the monetary chunks with the respectively depositing players, the management system can be configured to tag the money chunks with the groups (e.g. with card room, casino, etc.) as depositors.

Setting of value of the configurable parameter "C" can be provided on global network level and/or per cash table template and tournament. It is noted that in the case of C=1, APV corresponds to a conventional player's value known in the art.

The management system further uses equation (2) for calculating (411) the entire APV and updating (412) the game statistics accordingly. Operations 401-412 can be provided by player valuation unit 164.

Optionally, SBF, SBR and the entire APV can be calculated asynchronously with delay (e.g. 1-2 hours) from real time data. The calculations can be executed periodically (e.g. every hour), in response to a user-specified request, etc.

By way of non-limiting example, the calculated results can be included in reports to regulators, affiliates and accounting entities.

The following non-limiting example illustrates the operations above. For example, two players A and B deposited 100$ each, and play against each other. In the first hand, both of them are all-in, and Player A wins. The rake is assumed to be 1$ in total, and as both players invested equal % of money to the pot (both of them invested 100$ to the pot), each of them will be attributed with half of the total rake amount. So 0.50 USD rake is assigned to player A and 0.50 USD rake is assigned to player B. After the hand, player A has 199 USD, however from "source of the money" perspective it is 99.50 USD tagged with player A as depositor and 99.50 USD tagged with player B as depositor. On the next hand, player A plays against player C and each of them invest 199$ to the pot. The total pot is 398 USD and the total rake is assumed to be 2$.

If rake distribution is calculated with the conventional rake formula, the rake is distributed as 1$ to player A and 1$ to player C. However, calculation SBR as detailed with reference to FIG. 4, attributes SBR=0.5 USD to player A and SBR=0.5 USD player B. So player B will be attributed with some value, depending on the "C" coefficient, despite the fact he did not play the hand at all (he might even not be logged in). Assuming player C wins the hand, he would now own money tagged to player A and player B. Accordingly, if player C keeps playing, SBR will be attributed to player A and player B also in the following hands.

By way of non-limiting example, the management system is configured to manage virtual accounts in accordance with the following rules:

If, during a real money poker hand, money of a player $P_i$ enters the pot, the management system takes from the virtual account A, monetary chunks tagged with players other than player $P_i$ while the oldest chunks are taken first (the chunks with the same age can be chosen randomly).

If the virtual account $A_i$ comprises no monetary chunks tagged with players other than player $P_i$ the management system can take monetary chunks tagged with player $P_i$ (or respective card room). If the account further does not comprise such chunks, the management system can "deposit" the required amount by the calculation (e.g. if Account $A_i$ comprises two chunks—3$ tagged to other player and 2$ tagged to player $P_i$, and if player $P_i$ bets 6$, the system will "deposit" 1$ to the virtual account $A_i$ and will tag this chunk with $ID_i$ before associating all the chunks to this bet).

When, after a poker hand, money goes to player $_{pi}$'s virtual account $_{Ai}$, the management system keeps the source tagging and sorts the monetary chunks in the account by the timestamp.

If rake is taken, the management system attributes the rake value to different virtual accounts proportionally, according to depositors who contributed to the pot.

In case that new money enters the poker ecosystem because of cashing out points, bonus redemption, gift shop purchase or alike, the licensee of the player can be tagged as source of the money, such new chunks still will be tagged with the beneficiary player.

Optionally, monetary chunks can bear additional flag informative of a type of deposit (e.g. player deposited the money, the card room granted the player with bonus or tournament token, points exchanged for cash, etc.) money coming from any jackpots other than Knock Out (KO) can be tagged proportionally to the respective licensees.

In a case of tournaments, the management system can be further configured as follows:

For tournament registrations, re-buys and add-ons of player $P_i$, the management system takes from the virtual account $A_i$ monetary chunks tagged with players other than player $P_i$, while the oldest chunks are taken first. The management system attributes the value to different virtual accounts proportionally according to the fee paid by depositories.

Winning a seat from a satellite can be considered as a cash prize that is immediately spent for registration to the main tournaments.

In case of freeroll tournaments, tournaments with added money and overlays, the amount needed to cover the prize pool can be split between the licensees who are allowed for the tournament and can be tagged to them accordingly.

In case that the tournament token is given to player $P_i$ as bonus, the token amount is tagged to the player $P_i$.

Figures 5A, 5B:
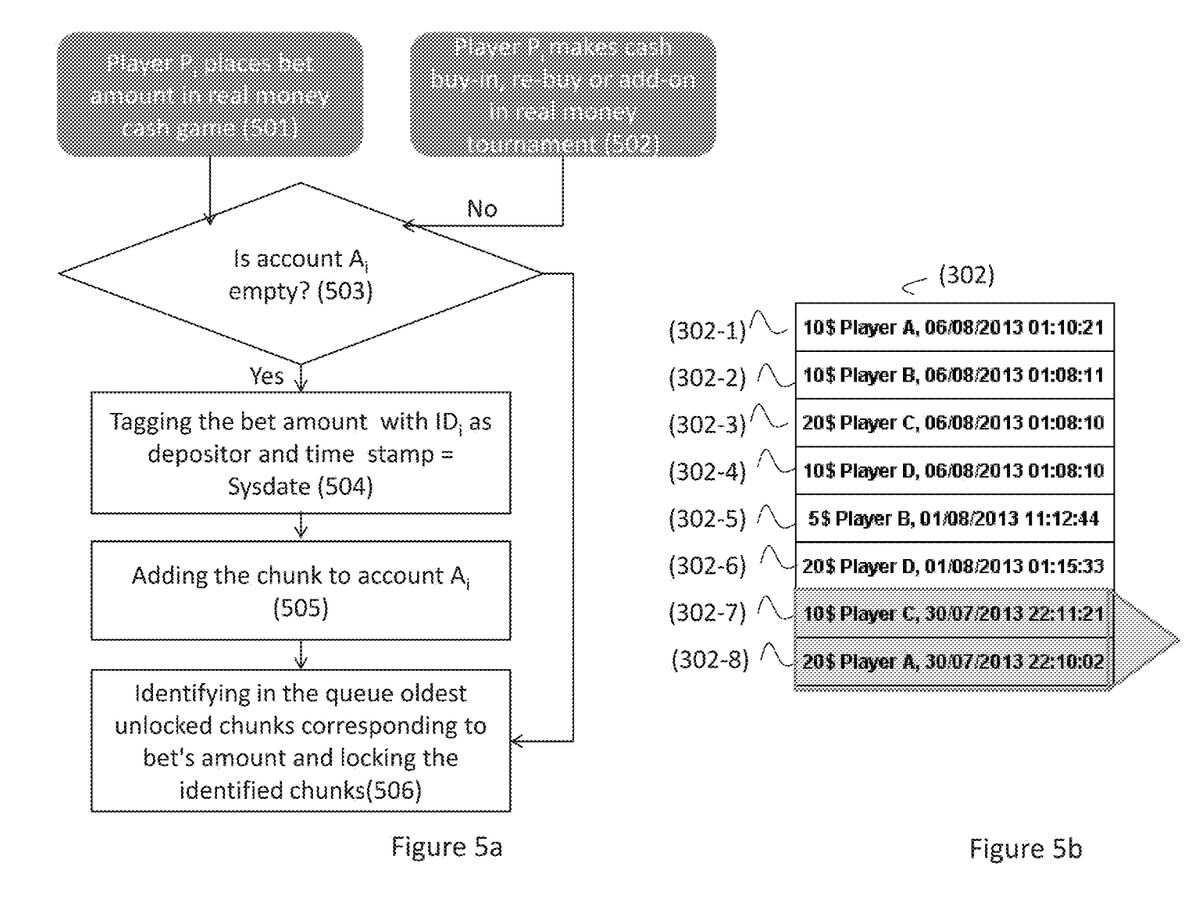
FIG. 5a illustrates a generalized flow chart of managing, in accordance with certain embodiments of the presently disclosed subject matter, a virtual account of a poker player in a case of betting.
FIG. 5b illustrates a non-limiting example of respective modification of the exemplary queue.

FIG. 5a illustrates a generalized flow chart of managing a virtual account $A_i$ in a case of betting by player $P_i$.

It is noted that with reference to FIGS. 5-8, a virtual account Ai is referred to as not "empty"; it comprises only money chunks tagged to other than player $P_i$ players.

In accordance with certain embodiments of the presently disclosed subject matter, when player $P_i$ places (501) a bet (no matter what game action—posting blinds, antes, call, bet, raise etc.) in a real money cash game or buys-in (502) for a tournament (or makes a rebuy or add-on) with real money, the management system checks (503) if the account $A_i$ is empty. If Yes, the management system tags (504) the bet amount $ID_i$ of player's $P_i$ as depositor and time stamp=Sysdate, and adds the respectively tagged monetary chunk to the virtual account $A_i$. The management system further identifies in the queue oldest unlocked chunks corresponding to the bet's amount, and locks (505) the identified chunks. Locking a chunk is indicative of unavailability of the respective chunk because of it being used in some game operation.

Figure 3B:
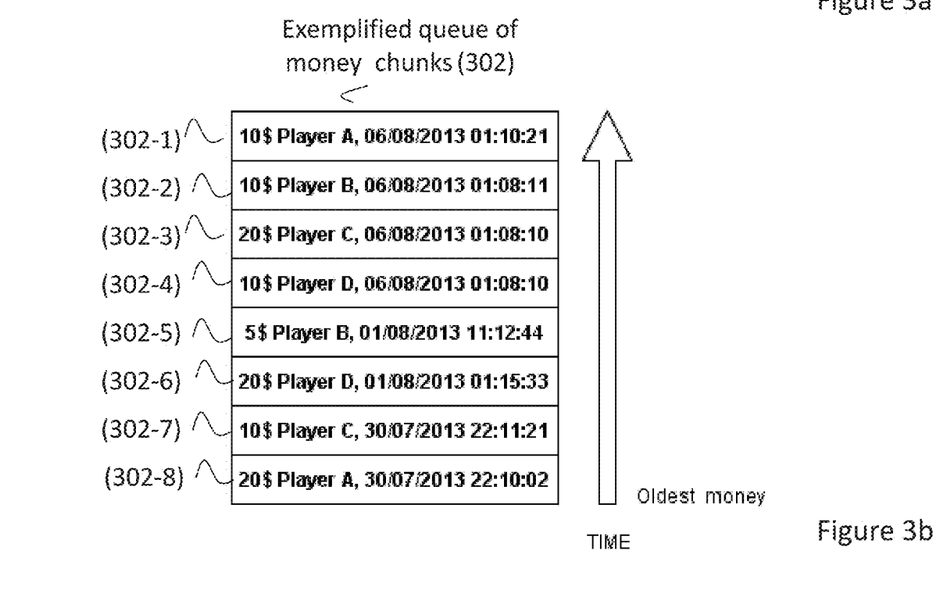

In the non-limiting example in FIG. 5b, the queue 302 previously illustrated with reference to FIG. 3b is modified in accordance with a 27$ bet made by Player $P_i$. The management system has locked 20$ from the chunk 302-8 tagged to player A and 7$ from the chunk 302-7 tagged to player C.

In the case of a tournament, the buy-in and fees are distributed proportionally between the players who are the sources of the total amount invested in the tournament.

Buy-in assigned to Player=Amount "taken"*(Buy-in amount/(Buy-in+Fee)) and

Fee assigned to Player=Amount"taken"*(Fee amount/(Buy-in+Fee))

The same formula can be applied for rebuys and add-ons.

If Player $P_i$ registered to a tournament with 27$ (25$ buy-in+2$ fee), it is assumed that money from the chunks 302-8 and 302-7 tagged with Player A and Player C as depositors are used in the following proportion:

Buy-in=20*(25/27)=18.52$ and Fee= 20*(2/27)=1.48$    Player A:

Buy-in=7*(25/27)=6.48$ and Fee=0.52$    Player C:

The calculated fees can be assigned upon termination of the tournament.

Figures 6A, 6B:
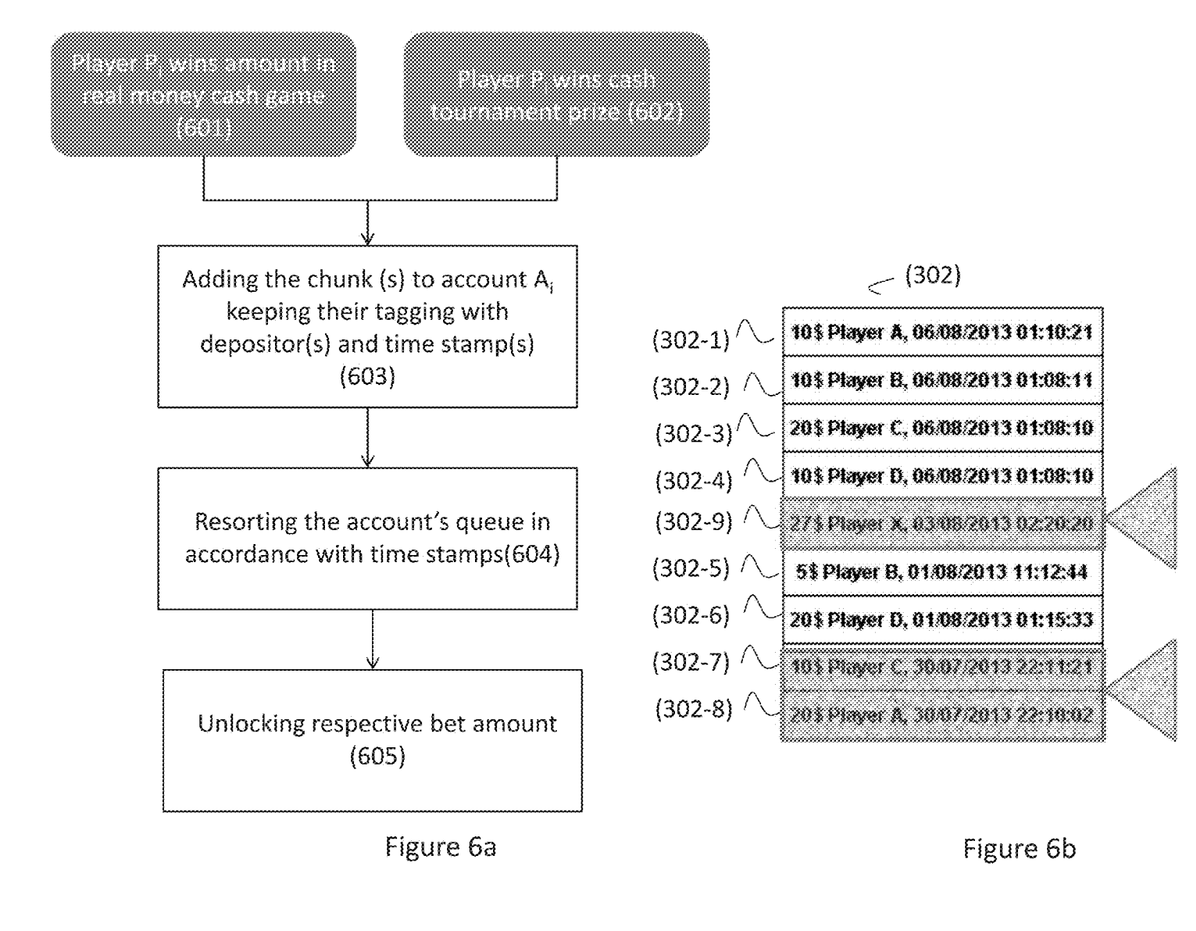
FIG. 6a illustrates a generalized flow chart of managing, in accordance with certain embodiments of the presently disclosed subject matter, a virtual account of a poker player in a case of winning.
FIG. 6b illustrates a non-limiting example of respective modification of the exemplary queue.

FIG. 6a illustrates a generalized flow chart of managing a virtual account of a poker player in a case of winning, and FIG. 6b illustrates a non-limiting example of respective modification of the exemplary queue.

When the player $P_i$ wins from a real money cash game (601) or a tournament (602), the management system adds (603) the chunk (s) to account $A_i$, whilst keeping their tagging with depositor(s) and time stamp(s). The management system further re-sorts (604) the account's queue in accordance with time stamps.

The amount won may come from more than one other players—in such cases, each chunk is added separately, keeping its own depositor and timestamp. In case of a tournament win, the accounts from where the winning comes, and the corresponding amounts, are calculated by dividing the amount won to the total number of participants in the tournament, minus one (e.g. if the player won 5th place and 20$ in a tournament with 201 players, it is considered that 200 players lost 0.10$ each to that player. The same logic can be applied for KO jackpots.

The management system further unlocks (605) the previously locked chunks with a respective bet amount, and updates the chunks if needed when some part of the respective amount was lost in the game.

In the exemplary queue illustrated in FIG. 6b, the player won the pot of 54$ (before rake), wherein 27$ was won from Player X. Previously locked 27$ in chunks 302-8 and 302-7 are unlocked and new chunk 302-9 is added.

Figure 7A:
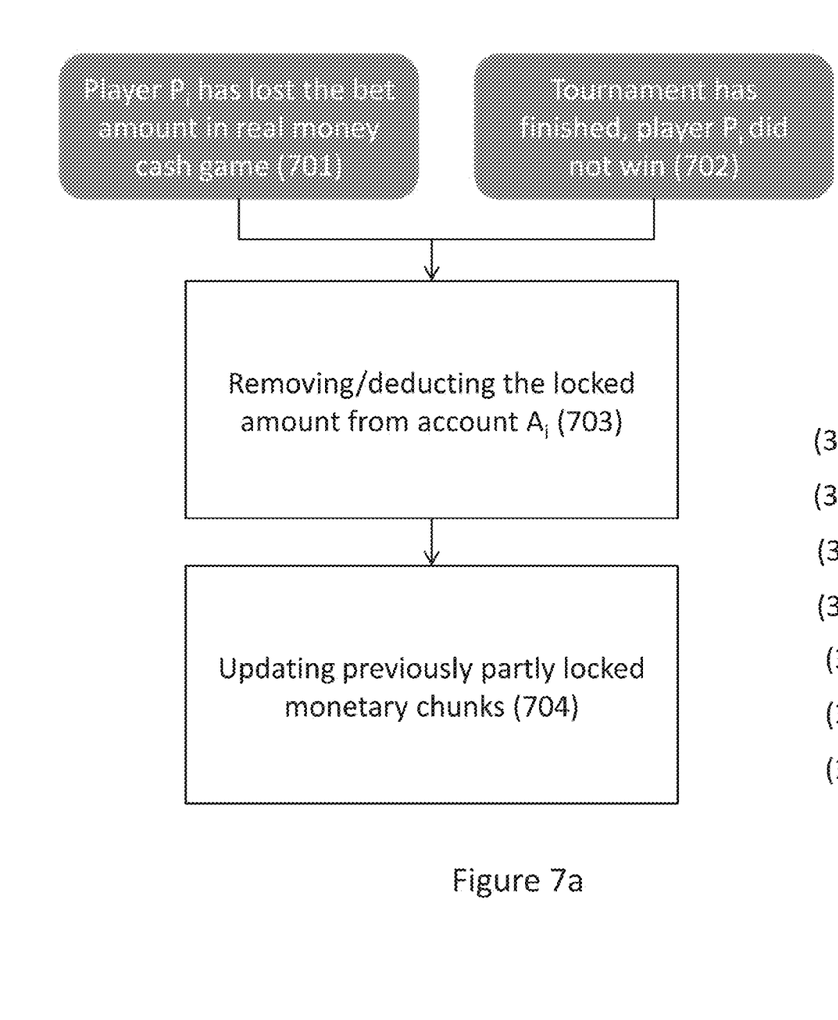
FIG. 7a illustrates a generalized flow chart of managing, in accordance with certain embodiments of the presently disclosed subject matter, a virtual account of a poker player in a case of a loss.

FIG. 7a illustrates a generalized flow chart of managing a virtual account of a poker player in a case of losing, and FIG. 6b illustrates a non-limiting example of respective modification of the exemplary queue.

When a player loses in a real money cash game (701) or did not win any prize from a tournament (702), the management system "takes out" (703) from the virtual account the amount that was locked as used for a bet (or tournament registration, rebuy, add-on). The management system further updates (704) the amount in partly locked chunks (i.e. chunks where only part of the respective amount has been previously locked).

For tournaments, the operation can be executed upon termination of the tournament.

Figure 7B:
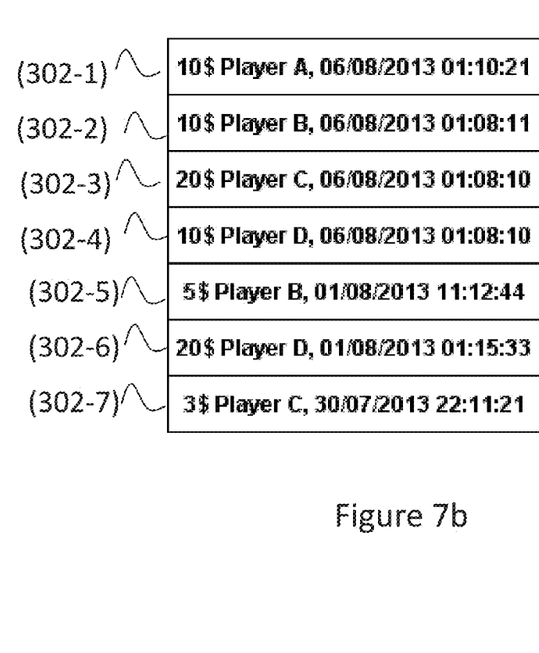
FIG. 7b illustrates a non-limiting example of respective modification of the exemplary queue.

In the exemplary queue illustrated in FIG. 7b, the player lost the bet of 27$, and previously locked 27$ in chunks 302-8 and 302-7 are deducted. Accordingly, chunk 302-8 is removed and the amount in chunk 302-7 is updated.

Figures 8A, 8B:
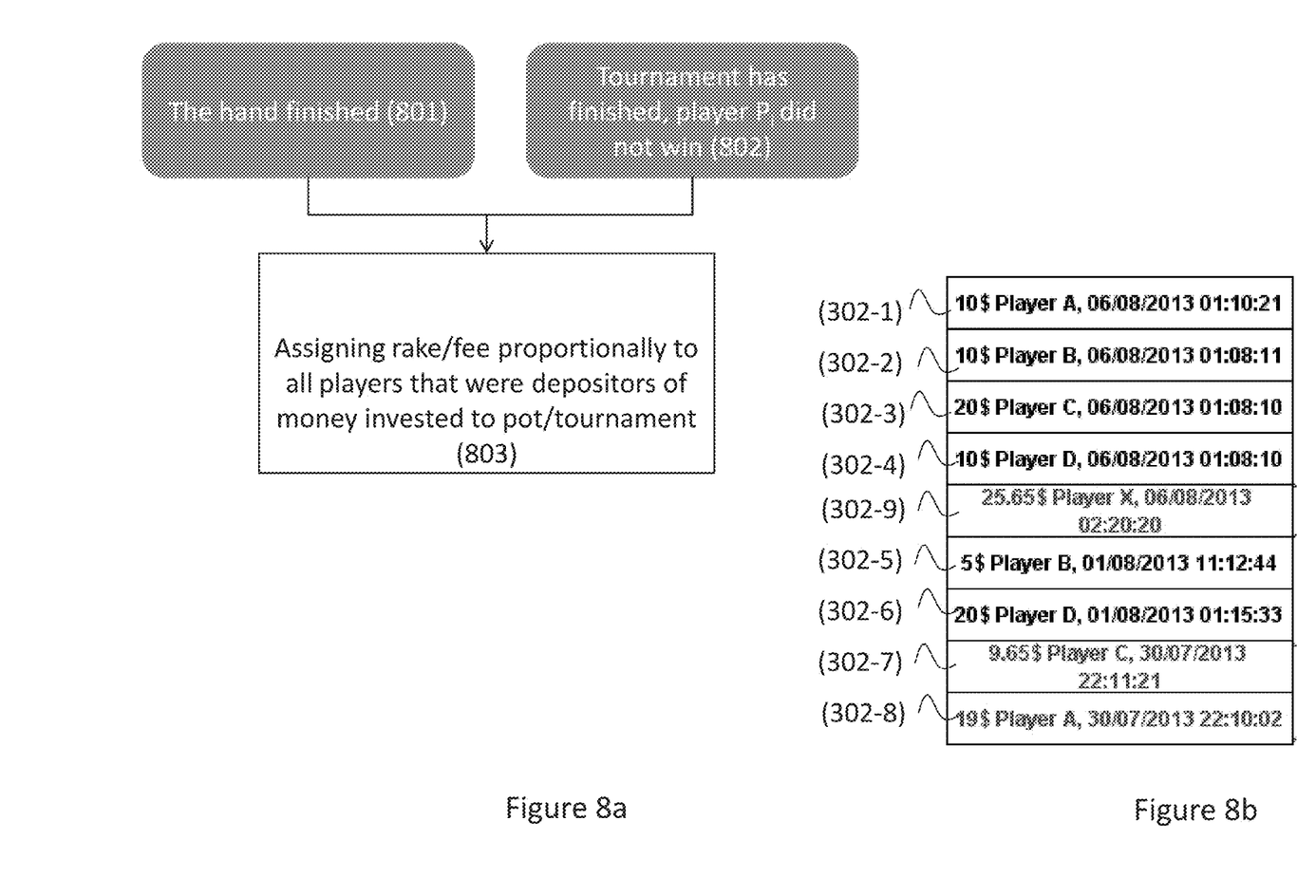
FIG. 8a illustrates a generalized flow chart of a rake/fee value attributing in accordance with certain embodiments of the presently disclosed subject matter.
FIG. 8b illustrates a non-limiting example of respective modification of the exemplary queue.

FIG. 8a illustrates a generalized flow chart of rake/fee value attributed in accordance with certain embodiments of the presently disclosed subject matter, and FIG. 8b illustrates a non-limiting example of respective modification of the exemplary queue.

Upon termination of a real money cash game (801), the management system attributes (803) a rake value proportionally to all depositors of the money contributed into the pot. Upon termination of a real money tournament (802), the management system attributes (803) to the depositors the fee that was already calculated proportionally at the moment of registration, rebuy or add-on.

The exemplary queue illustrated in FIG. 8b, illustrates the following non-limiting example. Assume the following: 5% rake, Player $P_i$ and Player X played the hand with 27$ bet by each (i.e. total bet was 54$), the total rake in the hand is 2.7$. Player $P_i$ won the hand. The rake of 2.7$ was distributed between depositors of money that was used for bets. Player X played with just deposited money, i.e. 27$ tagged with source Player X. Player $P_i$ played with 20$ tagged with source Player A and 7$ with source Player C.

Accordingly: as Player X's contribution is half of the total pot of 54$, the management system assigns to Player X 50% of the rake, i.e. 1.35$. As Player A's contribution is 20$ of 54$ (37.037%), the management system assigns to Player A 37.037% of the rake, i.e. 1$. As Player C's contribution is 7$ of 54$ (12.962%), the management system assigns to Player C 12.962% of the rake, i.e. 0.35$. Chunks 302-9, 302-8 and 302-7 in FIG. 8b are updated accordingly.

Following is a non-limiting example of calculating APV after the source based rake is distributed at the end of the hand. As discussed above, APV Rake can be calculated as follows:

$$APV\_RAKE = C*PLAYER\_RAKE\_ACTIVITY + (1-C)*SBR$$

For example, when C=0.5, the values of the players from the example are:

$$APV \text{ of Player } X = 0.5*1.35 + 0.5*1.35 = 1.35$$

$$APV \text{ of Player } A = 0.5*1.35 + 0.5*1 = 1.175$$

$$APV \text{ of Player } C = 0.5*0 + 0.5*0.35 = 0.175$$

So in such a case, when C=0.5, the Casino of Player X will earn 1.35$, the Casino of Player A will earn 1.175$ and the Casino of Player C will earn 0.175$.

After the source based fee is distributed, the APV_FEE can be calculated as follows:

$$APV\_FEE = C*PLAYER\_FEE\_ACTIVITY + (1-C)*SBF$$

Optionally, the calculation can be executed on historical data. All real money cash games and SNG tournaments can be reviewed and the source based rake/fee value can be attributed to the players. After that, the APV of each player will be recalculated and then analyzed.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of online valuating a client in a computerized service system comprising a processor operatively coupled to a memory storing a plurality of records informative of monetary chunks, each record informative of the monetary amount of the respective monetary chunk and tagged with a client who owns the respective monetary chunk, the method comprising:

analyzing, by the processor, the stored in the memory plurality of records to identify all clients directly involved in a monetary event;

for each identified directly involved client $C_i$, searching, by the processor, the stored in the memory plurality of records for all records informative of monetary chunks tagged with the client $C_i$, as an owner and generating a virtual account $A_i$, the virtual account $A_i$, being associated with the client $C_i$, and informative of all monetary chunks in an ownership of the client $C_i$, thereby giving rise to a plurality of virtual accounts associated with the identified directly involved clients, wherein generating the virtual account comprises tagging each monetary chunk with a depositor client who introduced the respective monetary chunk into the service system and with respective timestamp generated by the processor responsive to a predefined event;

analyzing, by the processor, the stored in the memory plurality of records to identify every client tagged as a depositor client to at least one monetary chunk corresponding to at least one virtual account of the plurality of virtual accounts, thereby giving rise to a plurality of clients indirectly involved in the event; and valuating one or more clients directly or indirectly involved in the event, wherein a value of each given client is calculated with consideration of a) all monetary chunks corresponding to the plurality of virtual accounts and tagged to the given client as a depositor client and b) timestamps of the respective monetary chunks.

2. The method of claim 1, wherein each monetary chunk is tagged with respective depositor client when the chunk first introduced to the system.

3. The method of claim 1, wherein each monetary chunk is tagged with timestamp generated when tagging with respective depositor client.

4. The method of claim 1, wherein the service system is a computerized game system.

5. The method of claim 4, wherein the monetary event is selected from a group consisting of poker hand and poker tournament.

6. The method of claim 1, wherein each monetary chunk is tagged with timestamp generated when respective monetary amount becomes visible to the computerized service system.

7. A computer program product implemented on a non-transitory computer usable medium having computer readable program code embodied therein to cause the computer to perform the method of claim 1.

8. A management system capable of online valuating a client in a computerized service system, the management system comprising a processor operatively coupled to a memory configured to store a plurality of records informative of monetary chunks, each record informative of the monetary amount of the respective monetary chunk, the processor configured:

to tag each record of the plurality of records with a client who owns the respective monetary chunk, with a depositor client who introduced the respective monetary chunk into the service system and with respective timestamp generated by the processor responsive to a predefined event, for each client directly involved in a monetary event, to generate a respective virtual account, thereby giving rise to a plurality of virtual accounts associated with the clients directly involved in the monetary event, wherein generating a virtual account to a given client comprises:

i. searching the plurality of records for all records informative of monetary chunks tagged with the given client as an owner;

ii. associating with the given client a virtual account being informative of all monetary chunks in an ownership of the given client, the virtual account being further informative of respective depositor clients and timestamp;

to parse the plurality of virtual accounts to identify every client tagged as a depositor client to at least one monetary chunk corresponding to at least one virtual account of the plurality of virtual accounts, thereby giving rise to a plurality of clients indirectly involved in the event; and to valuate one or more clients directly or indirectly involved in the event, wherein a value of each given client is calculated with consideration of a) all monetary chunks corresponding to the plurality of virtual accounts and tagged to the given client as a depositor client, and b) timestamps of the respective monetary chunks.

9. The management system of claim 8, wherein the processor is configured to tag each monetary chunk with respective depositor client when the chunk first introduced to the service system.

10. The management system of claim 8, wherein the processor is configured to tag each monetary chunk with timestamp generated when tagging with respective depositor client.

11. The management system of claim 8, wherein the service system is a computerized game system.

12. The management system of claim 11, wherein the monetary event is selected from a group consisting of poker hand and poker tournament.

13. The management system of claim 8, wherein each monetary chunk is tagged with timestamp generated when respective monetary amount becomes visible to the management system.

\* \* \* \* \*

UNITED STATES PATENT AND TRADEMARK OFFICE
CERTIFICATE OF CORRECTION

Page 1 of 1

PATENT NO. : 9,741,202 B2
APPLICATION NO. : 14/612390
DATED : August 22, 2017
INVENTOR(S) : Damian Sokol et al.

It is certified that error appears in the above-identified patent and that said Letters Patent is hereby corrected as shown below:

On the Title Page

Item (71) Applicant:
Please replace with the following:
Playtech Software Limited, Douglas (IM)

Signed and Sealed this
Twenty-second Day of May, 2018

Andrei Iancu
*Director of the United States Patent and Trademark Office*